United States Patent
Boksebeld et al.

(10) Patent No.: US 12,528,134 B2
(45) Date of Patent: Jan. 20, 2026

(54) METHOD FOR COAXIALLY WELDING TWO TUBES TOGETHER

(71) Applicant: KRANENDONK BEHEERSMAATSCHAPPIJ B.V., Tiel (NL)

(72) Inventors: Marinus Hermanus Maria Boksebeld, Tiel (NL); Johannes Petrus Hubertus Justin Geraerds, Tiel (NL); Chris Johannes Astrid Maria Warmenhoven, Tiel (NL); Bart Van Dam, Tiel (NL)

(73) Assignee: KRANENDONK BEHEERSMAATSCHAPPIJ B.V., Tiel (NL)

( * ) Notice: Subject to any disclaimer, the term of this patent is extended or adjusted under 35 U.S.C. 154(b) by 772 days.

(21) Appl. No.: 17/797,378

(22) PCT Filed: Feb. 9, 2021

(86) PCT No.: PCT/NL2021/050086
§ 371 (c)(1),
(2) Date: Aug. 3, 2022

(87) PCT Pub. No.: WO2021/162547
PCT Pub. Date: Aug. 19, 2021

(65) Prior Publication Data
US 2023/0056357 A1    Feb. 23, 2023

(30) Foreign Application Priority Data
Feb. 10, 2020   (NL) ...................... 2024866

(51) Int. Cl.
*B23K 9/028*   (2006.01)

(52) U.S. Cl.
CPC ................. *B23K 9/0286* (2013.01)

(58) Field of Classification Search
CPC ... B23K 9/0282; B23K 9/0286; B23K 33/006
See application file for complete search history.

(56) References Cited

U.S. PATENT DOCUMENTS

| 4,182,950 A | 1/1980 | Boros | |
| 2007/0297556 A1* | 12/2007 | Spencer | B23K 9/0286 |
| | | | 376/245 |

FOREIGN PATENT DOCUMENTS

| AT | 12413 U1 | 5/2012 |
| GB | 656696 A | 8/1951 |

(Continued)

OTHER PUBLICATIONS

Machine translation of Erne, AT 12413, performed on Jun. 6, 2025 (Year: 2012).*

(Continued)

*Primary Examiner* — Brian W Jennison
(74) *Attorney, Agent, or Firm* — Procopio, Cory, Hargreaves & Savitch LLP

(57) ABSTRACT

The invention provides a method for coaxially welding together two tubes. Axial ends of the tube walls of the respective tubes are machined in such a way that they have a stepped shape over at least a first part of the tube wall thicknesses. The stepped shapes complement each other. The method comprises the subsequent steps of A positioning the first tube and the second tube coaxially with respect to each other, wherein the machined axial ends contact each other at least over the first part of the first tube wall thickness and the first part of the second tube wall thickness and wherein the first stepped shape of the machined axial end of the first tube wall and the second stepped shape of the machined axial end of the second tube wall fit into each other, and wherein a seam is present between the first parts of the first tube and the second tube thicknesses, B fixating the first tube and the second tube at discrete positions over (Continued)

the circumference of the seam via attachment welds, C welding the first tube and the second tube to each other over the entire circumference of the first tube and the second tube, wherein the circumferential weld extends over the entire thickness of the first tube all and over the entire thickness of the second tube wall.

20 Claims, 3 Drawing Sheets

(56) References Cited

FOREIGN PATENT DOCUMENTS

| | | |
|---|---|---|
| JP | S54-74240 A | 6/1979 |
| JP | S54-074240 A | 6/1979 |
| JP | S56-102394 A | 8/1981 |
| JP | H04-288969 A | 10/1992 |
| JP | 2009-291828 A | 12/2009 |
| KR | 10-0739104 B1 | 7/2007 |

OTHER PUBLICATIONS

Patent Cooperation Treaty, International Search Report, Application No. PCT/NL2021/050086, dated May 6, 2021, in 12 pages.
Office Action received in KR 10-2022-7029070, dated Apr. 16, 2025, in 9 pages (with translation).

* cited by examiner

METHOD FOR COAXIALLY WELDING TWO TUBES TOGETHER

CROSS-REFERENCE TO RELATED APPLICATIONS

This application is US National Stage of International Patent Application PCT/NL2021/050086, filed Feb. 9, 2021, which claims benefit of priority from Dutch Patent Application 2024866, filed Feb. 10, 2020, the contents of both of which are incorporated herein by reference.

The present invention relates to a method for coaxially welding two metal tubes together. In the context of the present description, the wording tubes not only refers to straight tubes, but also to similar products such as corners, T-pieces and reducers. The invention can be implemented for the manufacture of piping e.g. for the transport of liquids in petrochemical installations, aboard ships or vessels or on off-shore constructions. Such liquids are e.g. (waste or drink) water or process liquids such as oil. It is known to assemble the said piping from so-called spools, which are formed by a combination of tubes welded to each other and similar products such as T-pieces, corners, reducers and flanges. Such spools typically have a length of at most about 4 meters and contain a number of steel tubes, e.g. having a diameter of between 51 mm and 305 mm (2 inch and 12 inch) and having a wall thickness of between 2 mm and 15 mm, the tubes being welded to each other. The spools can be welded on a production location. The piping is subsequently made by welding the spools to each other on the job.

To obtain a good welding penetration, it is known to apply V-shaped or U-shaped welding seams between the coaxial tubes and/or similar products, wherein the tubes are fixated together via attachment welds at a small distance of each other, so having a slit of e.g. 10.0 mm or 1.2 mm between the tubes in the bottom of the welding seam, before the tubes are welded to each other circumferentially. The circumferential welding of the tubes is a highly sensitive process as a result of which, if this welding process is carried out manually, this requires a highly skilled welder and, if this welding process is automated or at least mechanized, a relative large risk of welding errors remains.

From publication UK 656,696 it is e.g. known to weld together two tubes coaxially, by first placing said tubes against each other. The welding seams of the tubes that face each other have a protrusion, arranged at the radially innermost portion of the tube, and protruding both inwardly as well as forwardly with respect to the welding seam itself. The protrusion has a stepped shape at its end face. The welding seams are inclined away from each other. When the tubes are placed against each other, the above-mentioned U-shaped or V-shaped slit thus results. By filling the slit with welding material, the tubes are welded together coaxially. When the weld is finalized, the entire protrusion is removed.

Publication AT 12 412 U1 also discloses a method for coaxially welding together two tubes. The welding seams of the tubes that face each other have a stepped shape at the radially innermost part thereof, which protrudes forwardly with respect to the welding seam of the tube. The welding seams are inclined, such that a U-shaped or V-shaped slit results when the tubes are placed against each other. By filling the slit with welding material, the tubes are welded together coaxially.

The present invention aims to provide a method wherein the chance of welding errors, such as an improper welding penetration or on the contrary shooting the weld pool through the weld seam, is reduced. Therefore the invention provides a method according to claim 1. It has been found that by using tubes having tube wall of which the axial ends have respective complementary stepped shapes, said tubes can very easily be aligned correctly with respect to each other and additionally can be welded together in an automated manner relatively reliable. The complimentary stepped shapes herein ensure precise mutual positioning of the tubes before they are fixated to each other according to step B and subsequently, according to step C, are welded circumferentially.

In an embodiment, the first stepped shape extends, when seen in the axial direction of the first tube, within a length having a magnitude of between 0.01 mm and 1.50 mm. Within this bandwidth, it is possible on the one hand to correctly position the first tube and the second tube against each other in an aligned manner and on the other hand to obtain a proper welding penetration. In further embodiments the magnitude of the said length is between 0.10 mm and 1.00 mm or, more specifically, between 0.15 mm and 0.75 mm. At the lower boundary of the said bandwidths, there is an increased risk that the tubes are not positioned correctly with respect to each other before the circumferential welding. At the boundary side of the said bandwidths, the risk of welding errors increases.

The quality of the weld joint appears to be secured especially when the first part of the first tube wall thickness, when seen in the radial direction of the first tube, extends within a length having a magnitude of between 2.0 mm and 12 mm. In further embodiments the said magnitude is between 2.5 mm and 10 mm or more specifically between 3.0 mm and 8.0 mm.

A suitable way to implement the respective stepped shapes is to implement the first stepped shape comprising an outer annular end face and an inner annular end face, which outer annular end face and which inner annular end face, when seen in the axial direction of the first tube, are arranged at a distance of each other. The wording "inner" and "outer" relates to the axes of the respective tubes. Such stepped shapes can advantageously be obtained by milling the axial ends of the tube wall of the respective tubes, e.g. using a 3-axis milling machine.

Both for creating the stepped shapes as well as for the welding process itself, preferably the said outer annular end face and/or the said inner annular end face extend(s) parallel to a radial plane oriented perpendicular to the axial direction of the first tube. In this way, the risk that the weld joint shears will be low.

In a further embodiment, the first part of the first tube wall extends over the entire thickness of the first tube wall and/or the first part of the second tube wall extends over the entire thickness of the second tube wall. This allows the axial ends of the tube walls of the respective tubes to contact each other over an entire thickness. Such an embodiment can mainly be advantageous when the thickness of the respective tube walls is at most 8 mm. For such wall thicknesses a fully penetrated weld can be achieved in a single welding layer with suitable welding techniques.

Mainly for connecting tubes having walls with a thickness of 6.0 mm or more, in a further embodiment the machined end of the first tube wall is, seen in a radial direction, further machined at the outer side of the first part of the first tube wall thickness over a second part of the first tube wall thickness connecting to the first part of the first tube wall thickness and likewise the machined end of the second tube wall is machined at the outer side of the first part of the second tube wall thickness over a second part of the second tube wall thickness connecting to the first part of the second tube wall, wherein after performing step A an open seam results between the second parts of the first tube and the second tube thickness. A circumferential welding joint between such tubes will generally be built in multiple welding layers.

The said open seam can be substantially V-shaped or U-shaped when seen in its longitudinal cross section.

To obtain a proper welding penetration and a relatively narrow welding joint, in a further embodiment the first parts of the first tube and the second tube thicknesses are arranged within the maximum axial dimension of the open seam, when seen in the axial direction. In more specific embodiments, the said first parts are arranged in the middle 50% of the maximum axial dimension of the open seam or, even more specifically, within the middle 10% of the maximum axial dimension of the open seam.

In a further embodiment the method further comprises the step of, before step A, milling the axial ends of the first tube wall and the second tube wall to obtain the machined ends of the first tube wall and the second tube wall. The milling can for example be carried out with the aid of a relatively simple three-axial milling device.

An efficient way to weld the two tubes together can according to the invention be achieved when, while carrying out step C, a single welding layer is welded which extends at least entirely over the first parts of the first tube wall and the second tube wall thicknesses.

In a further embodiment, while carrying out step C, at least a part of the circumferential weld which extends over the first parts of the first tube wall and the second tube wall thicknesses is welded via TIG-welding. Via TIG-welding a relatively deep penetration can be obtained. The firm Fronius offers the so-called ArcTIG process. This TIG-process has been proven to be suited for carrying out the present invention.

It can further be beneficial for the welding process if the welding supply material is supplied to the welding pool in an automated manner during the TIG-welding as a wire, possibly in a pre-heated state.

For carrying out the welding process in an automated manner, in a further embodiment of the method, while carrying out step C, a welding torch is positioned at a fixed position with respect to the seam between the first tube and the second tube fixated to each other during step B, and the first tube and the second tube which are fixated to each other are rotated about their coaxial axis.

The invention will be further elucidated by means of the description of a number of embodiments of a method according to the invention with reference to the following figures.

Figure 1:
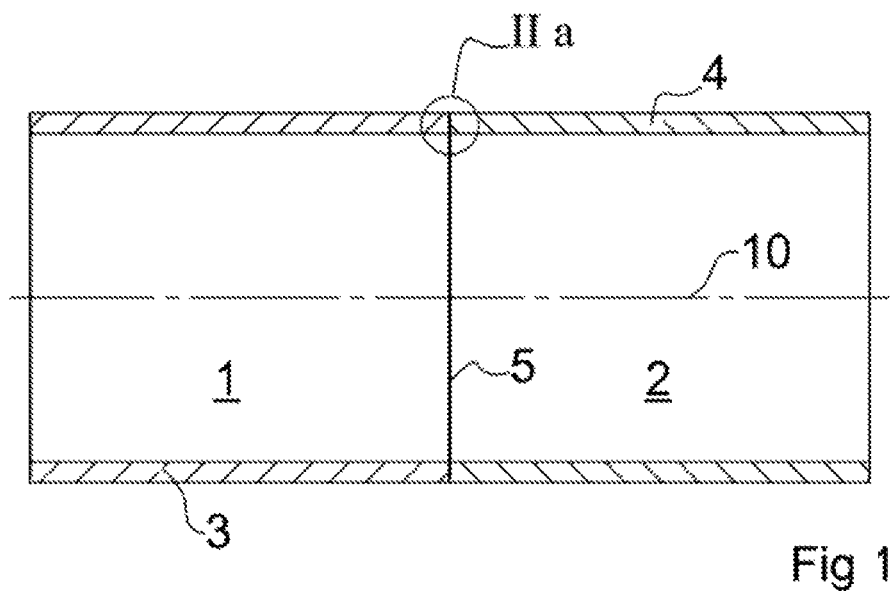
FIG. 1 shows, in an axial longitudinal cross section, two tubes that are positioned coaxially with respect to each other, for implementation of a method according to the invention.
Figure 2A:
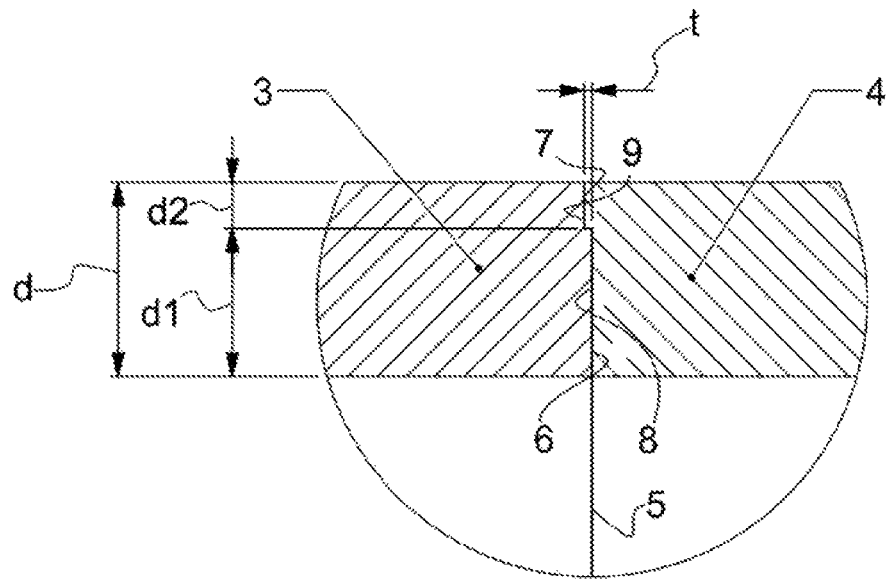
FIG. 2a shows the encircled area IIa of FIG. 1 in an unwelded state.

FIG. 1 shows two steel tubes 1, 2 each with an (outer) diameter of 114.3 mm (4 inch). Tubes 1, 2 are positioned coaxially with respect to each other and against each other and respectively have a cylindrical tube wall 3, 4. The thicknesses of the tube walls 3, 4 are equal to each other and are indicated in FIG. 2a with the letter d. In the present embodiment, d is equal to 6.0 mm. Also the inner diameters of the tubes 1, 2 are equal to each other, like the outer diameters of tubes 1, 2. Between the tubes 1, 2 that are positioned against each other, more specifically between the axial end faces of the tube walls 3, 4 of the respective tubes 1, 2 that face each other, a seam 5 is present, more specifically a welding seam 5.

When seen in an axial longitudinal cross section as shown in FIG. 2a, the welding seam 5 has a stepped shape as the axial ends of the tube walls 3, 4 that face each other each have a stepped shape. These respective stepped shapes complement each other as a result of which the said axial ends fit into each other when the tubes 1, 2, as in FIG. 1, are coaxially positioned against each other. The tubes 1, 2 lock each other in the radial direction, such that tubes 1, 2 cannot move in the radial direction with respect to each other and hence remain coaxial to each other.

Figure 2B:
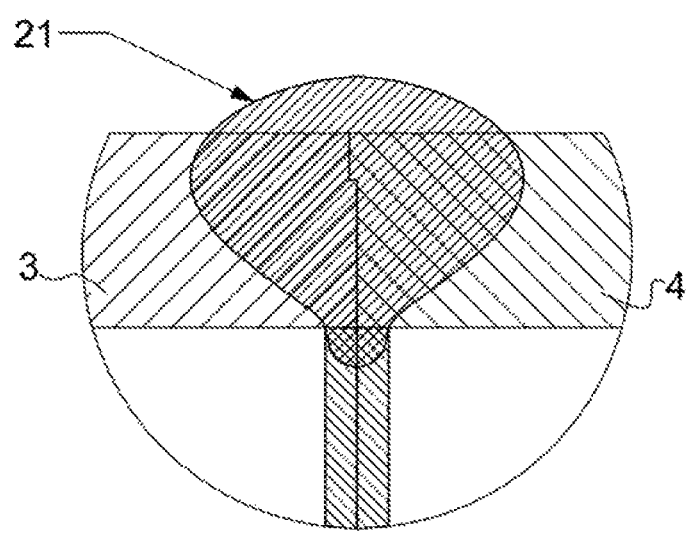
FIG. 2b shows the area according to FIG. 2a in a welded state.

The said stepped shapes of the axial ends of the tube walls 3, 4 are obtained by a milling process. More specifically, the said stepped shapes of the axial end faces are the result of the respective axial end of tube 3 having an inner annular end face 6 and an outer annular end face 7. The end faces 6, 7 of tube wall 3 are arranged at a distance t from each other when seen in the axial direction of tube 1. In the chosen example t equals 0.25 mm. The radial dimension d1 of the inner annular end face 6 in the chosen embodiment is 4.5 mm and the radial dimension d2 of the outer annular end face 7 is 1.5 mm. In the embodiment of FIGS. 1, 2a and 2b, d equals d1+d2. The inner annular end face 6 forms a protruding part on the respective axial end of tube wall 3. In general it is advantageous when d2 is smaller than d1 such that the transfer between d1 and d2 is relatively close to the outer diameter of the tube, which is advantageous for the reliability of the weld joint to be made. On the other hand it can be disadvantageous when d2 becomes so small that the respective protruding part is vulnerable to damages. In general it is preferred to choose d2 larger than 0.5 mm or even larger than 1.0 mm.

Wall tube 4 has an inner annular end face 8 and an outer annular end face 9 which are arranged at a distance t from each other in the axial direction as well. The radial dimensions of the end faces 8, 9 are respectively equal to d1 and d2. The outer annular end face 9 is a part of the protruding part on the respective axial end of tube wall 4.

In view of the above description the stepped shapes of the axial ends of tube walls 3, 4 that face each other complement each other.

The welding of tubes 3, 4 can e.g. be effected by the TIG welding process. For welding the tubes 3, 4 to each other a common axis 10 of the tubes 1, 2 is oriented horizontally and the tubes 1, 2 are fixated to each other at a number of discrete, mutually approximately equidistant positions at the outer side of welding seam 5 via attachment welds. In this fixated situation, one of the tubes 1, 2 is clamped in a turning device that allows for a rotation of the attached tubes 1, 2 about their common axis 10. Seen in the direction parallel to axis 10, a welding torch is subsequently placed directly above welding seam 5, at a 12 o'clock orientation. Subsequently the welding process is started, wherein the welding torch remains at its position or substantially at its position, and the welding seam 5 rotates a full 360° about axis 10. The welding can be effected at a relatively high amperage, e.g. more than 300 A and at a relatively high speed of e.g.

between 25 and 30 cm per minute. The welding process results in a welding layer 21 as shown in FIG. 2b. Welding layer 21 is a welding penetration and extends at both the inner side of tube walls 3, 4 as well as the outer sides thereof. Even though FIG. 2b shows the stepped shape of the axial ends of the tube wall 3, 4 for clarity purposes and for the purpose of explaining the present invention, it will be clear to a skilled person that all material of the tubes 1, 2 inside the welding layer 21 has been molten. It is advantageous to use the same welding process for welding the welding layer 21 and for welding the said attachment welds.

Figure 3:
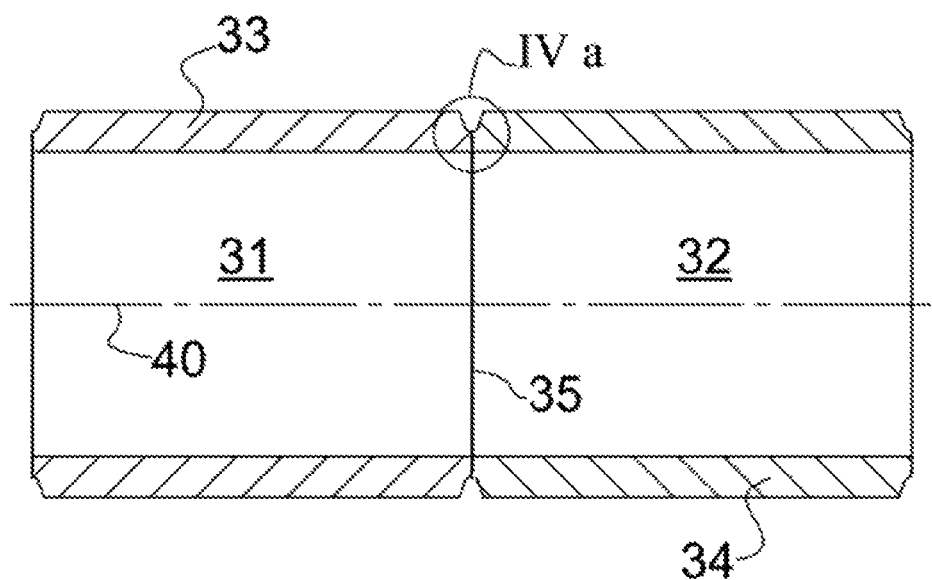
FIG. 3 shows, in axial longitudinal cross section, two other tubes that are positioned coaxially with respect to each other, for implementation of a method according to the invention.

FIG. 3 shows two steel tubes 31, 32 coaxial with respect to each other and positioned against each other, with a welding seam 35 in between. Tubes 31, 32 have a cylindrical tube wall 33, 34 of which the respective thicknesses are equal but larger than thickness d of tubes 3, 4. In the present embodiment the thickness D of tube walls 33, 34 equal approximately 10 mm. Welding seam 35 has, at least in axial cross section, a stepped shape at the inner side of the tube walls 33, 34 which is equal to the stepped shape of welding seam 5. More specifically, D1=d1, D2=d2 and T=t. At the outer sides of tube walls 33, 34 the welding seam 35 is open and more specifically welding seam 35 is substantially U-shaped. The bottom of the U-shape is rounded with a radius R and the legs of the U-shape diverge and enclose an angle a having a magnitude of 40 degrees. The stepped shape of the inner part of the welding seam 35 is within the middle 10% of the U-shape at the outer circumference of tubes 33, 34, when seen in the axial direction.

Figure 4A:
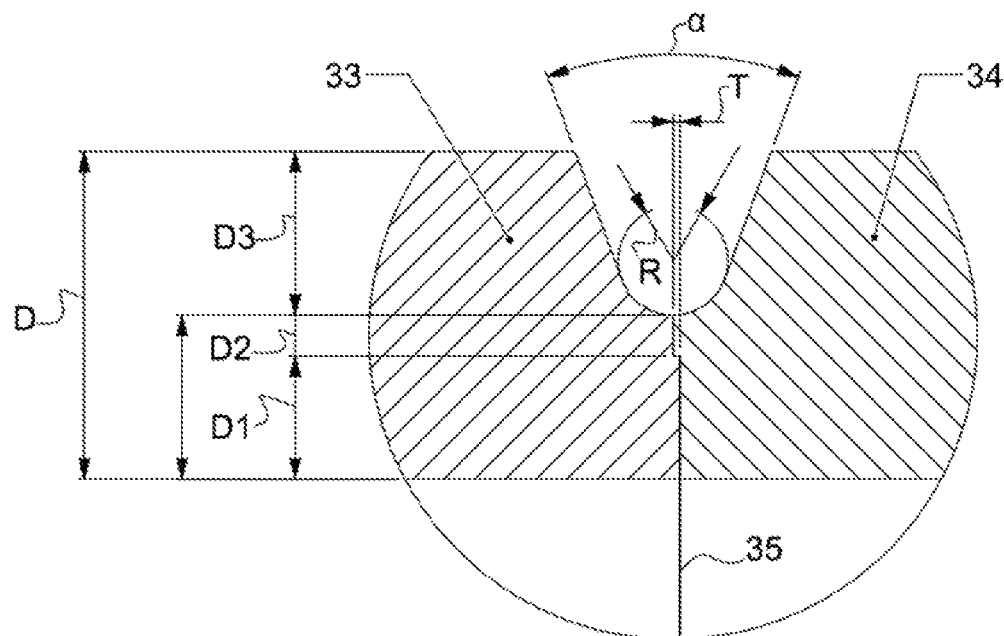
FIG. 4a shows the encircled area IVa in FIG. 3 in an unwelded state.
Figure 4B:
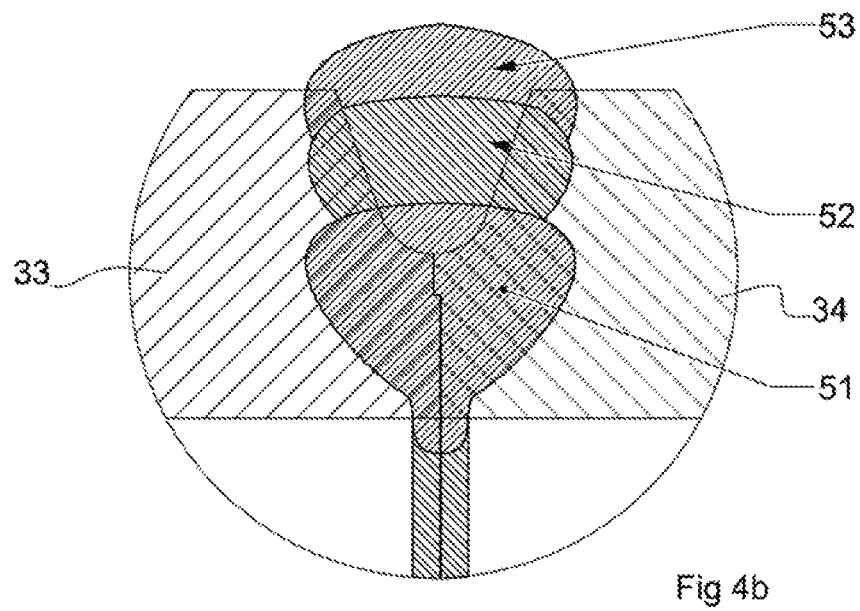
FIG. 4b shows the area according to FIG. 4a in a welded state.

FIG. 4b shows the cross section according to FIG. 4a in a welded state. Welding seam 35 is welded over the entire thickness D of the tube walls 33, 34 by a base welding layer 51, a welding layer 52 on top of it and a third welding layer 53 extending to both sides of the tube walls 33, 34. The welding layers 52 and 53 that are arranged on the base welding layer 51 can advantageously be welded with a different welding process, such as the MIG/MAG process, to allow the welding seam to be filled faster.

The invention claimed is:

1. A method for coaxially welding together a first metal tube having a first tube wall and a second metal tube having a second tube wall, wherein the inner diameter of the first tube equals an inner diameter of the second tube and wherein an axial end of the first tube wall is machined in such a way that the axial end of the first tube wall, when seen in a longitudinal cross section, has a first stepped shape over at least a first part of a first tube wall thickness, the first part extending from an inner side of the first tube wall, and wherein an axial end of the second tube wall is machined in such a way that the axial end of the second tube wall, when seen in a longitudinal cross section, has a second stepped shape over at least a first part of the second tube wall thickness, the first part extending from an inner side of the second tube wall, and wherein the first stepped shape and the second stepped shape complement each other, the method comprising subsequent steps of:

A: positioning the first tube and the second tube coaxially with respect to each other, wherein the respective machined axial ends contact each other at least at a location of the first part of the first tube wall thickness and the first part of the second tube wall thickness, the first stepped shape of the machined axial end of the first tube wall and the second stepped shape of the machined axial end of the second tube wall fitting into each other such that, as a result of the fit of the first stepped shape and the second stepped shape a movement of the first tube and the second tube with respect to each other in a radial direction is blocked;

B: fixating the first tube and the second tube at a number of discrete positions at a circumference of seam via attachment welds; and C: circumferentially welding the first tube and the second tube over a entire circumference of the first tube and the second tube, wherein the circumferential weld extends over the entire thickness of the first tube wall and over the entire thickness of the second tube wall, wherein the first part extending from the inner side of the first tube wall and comprising an inner annular end face and an outer annular end face, the outer annular end face being smaller than the inner annular end face and having a thickness of at least 1.0 mm.

2. The method according to claim 1, wherein the stepped shape, seen in the axial direction of the first tube, extends within a length having a magnitude of between 0.01 mm and 1.50 mm.

3. The method according to claim 1, wherein the first part of first tube wall thickness, seen in the radial direction of the first tube, extends within a length having a magnitude of between 2.0 and 12 mm.

4. The method according to claim 1, wherein the first stepped shape comprises an outer annular end face and an inner annular end face, the outer annular end face and the inner annular end face, seen in the axial direction of the first tube, being arranged at a distance of each other.

5. The method according to claim 4, wherein the outer annular end face and/or the inner annular end face extend(s) parallel to a radial plane that is oriented perpendicular to the axial direction of the first tube.

6. The method according to claim 1, wherein the first part of the first tube wall extends over the entire thickness of the first tube wall and/or wherein the first part of the second tube wall extends over the entire thickness of the second tube wall.

7. The method according to claim 1, wherein the machined end of the first tube wall, seen in radial direction, is further machined at the outer side of the first part of the first tube wall thickness over a second part of the first tube wall thickness connecting to the first part of the first tube wall, and wherein the machined end of the second tube wall, at the outer side of the first part of the second tube wall thickness, is further machined over a second part of the second tube wall thickness connecting to the first part of the second tube wall, wherein after performing step A an open seam is present between the second parts of the first tube and the second tube thicknesses.

8. The method according to claim 7, wherein the open seam is substantially V-shaped or U-shaped when seen in a longitudinal cross section.

9. The method according to claim 7, wherein, when seen in the axial direction the first parts of the first tube and the second tube thicknesses are arranged within a maximum axial dimension of the open seam.

10. The method according to claim 1, comprising the step of, before step A, milling the axial ends of the first tube wall and the second tube wall for obtaining the machined ends of the first tube wall and the second tube wall.

11. The method according to claim 1, wherein when performing step C a single welding layer is welded that extends at least entirely over the first parts of the first tube wall and the second tube wall thicknesses.

12. The method according to claim 1, wherein when performing step C at least a part of the circumferential weld which extends over the first parts of the first tube wall and the second tube wall thicknesses, is welded by TIG welding.

13. The method according to claim 12, wherein a welding supply material is supplied to a welding pool during the TIG welding as a wire in an automated manner, preferably in a preheated condition.

14. The method according to claim 1, wherein while performing step C a welding torch is positioned at a fixed position with respect to the seam between the first tube and the second tube fixated to each other during step B, and wherein the fixated first tube and second tube are rotated about their coaxial axes.

15. The method according to claim 2, wherein the stepped shape extends within a length having the magnitude of between 0.10 mm and 1.00 mm.

16. The method according to claim 2, wherein the stepped shape extends within a length having the magnitude of between 0.15 mm and 0.75 mm.

17. The method according to claim 3, wherein the first part of first tube wall thickness, seen in the radial direction of the first tube, extends within the length having the magnitude of between 2.5 mm and 10 mm.

18. The method according to claim 3, wherein the first part of first tube wall thickness, seen in the radial direction of the first tube, extends within the length having the magnitude of between 3.0 mm and 8.0 mm.

19. The method according to claim 9, wherein, when seen in the axial direction, the first parts of the first tube and the second tube thicknesses are arranged within a middle 50% of the maximum axial dimension of the open seam.

20. The method according to claim 9, wherein, when seen in the axial direction, the first parts of the first tube and the second tube thicknesses are arranged within a middle 10% of the maximum axial dimension of the open seam.

\* \* \* \* \*